Aug. 28, 1956     W. HARTRANFT     2,760,794
VIBRATION RINGS FOR MECHANICAL SEALS
Filed Nov. 16, 1953
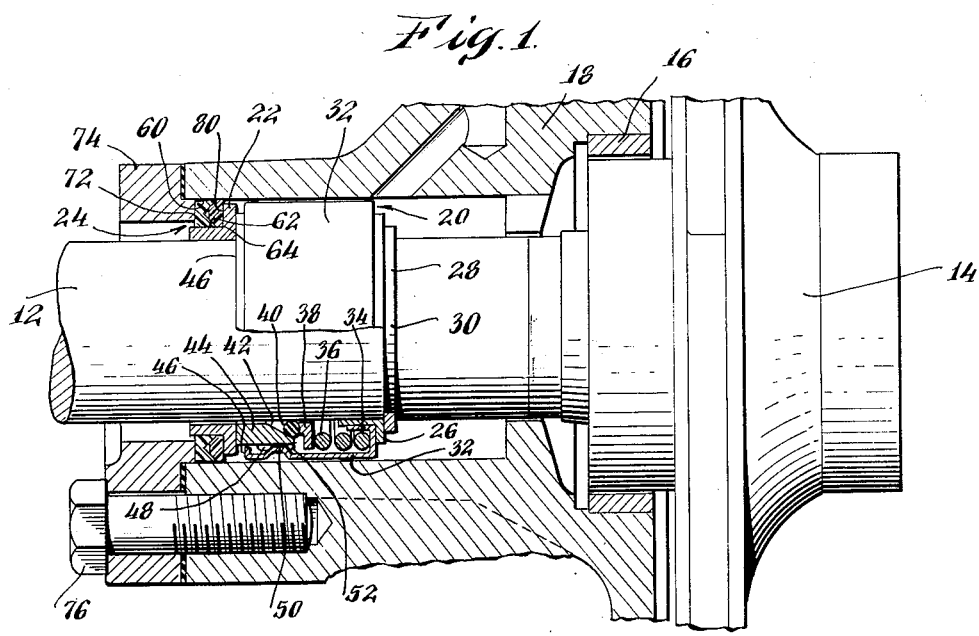
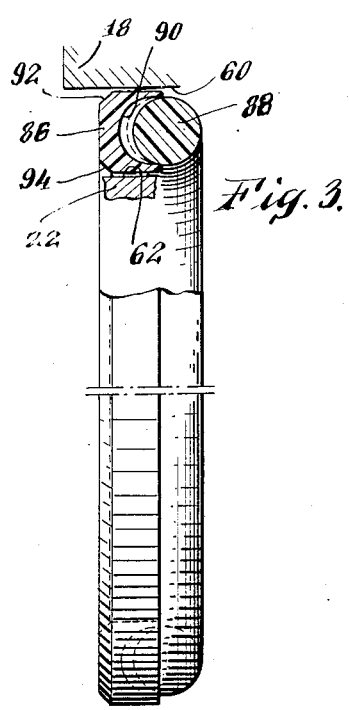
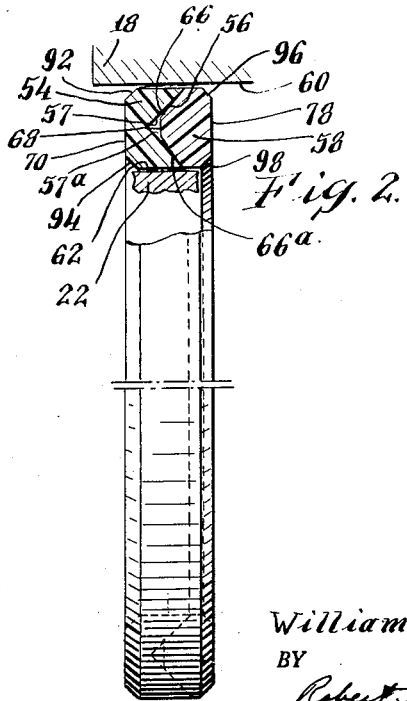
INVENTOR.
William Hartranft
BY
Robert Henderson
ATTORNEY.

United States Patent Office 2,760,794
Patented Aug. 28, 1956

2,760,794

VIBRATION RINGS FOR MECHANICAL SEALS

William Hartranft, Palmyra, N. Y., assignor to The Garlock Packing Company, Palmyra, N. Y., a corporation of New York Application November 16, 1953, Serial No. 392,149

5 Claims. (Cl. 286—11.14)

This invention relates to improvements in rings, which are sometimes called "vibration rings," employed to resiliently support an abutment ring which is employed with or as a part of a mechanical sealing device for sealing a space between a shaft and a machine-casing opening through which the shaft extends.

Mechanical seals usually have a rigid sealing ring, encircling and fluid-tightly and flexibly associated with (for example) a rotary shaft, and include spring means which urge the rigid sealing ring axially into sliding, rotary sealing association with a usually flat abutment surface of a machine-casing portion surrounding the shaft or of an abutment ring which is fluid-tightly supported within said casing portion.

The rotation of such shafts is usually somewhat irregular in the sense that, during rotation, the shaft may shift or vibrate laterally or endwisely or may tilt slightly relatively to a surrounding machine-casing portion. Such vibrations may occur even under apparently precise and correct assembling conditions, but they may become considerably accentuated if a supporting bearing is worn or poorly fitted or if whipping of the shaft is encountered because of supporting bearings being spaced too far apart or because the shaft may have insufficient inherent rigidity.

Although such irregularities of shaft operation are usually very slight, they, if not compensated or absorbed at one or both of the rotatively sliding sealing and abutment rings, cause the sealing ring to vibratorily separate from the abutment ring, either by straight axial separation of said rings or by tilting of one such ring and not the other, thereby permitting leakage through the seal to occur between said rings. At higher shaft speeds this condition usually becomes progressively worse.

Prior to the present invention, this problem was attacked with considerable success by having the sealing ring sealingly slide rotatively upon an abutment ring which was resiliently and fluid-tightly supported within or adjacent to the shaft opening in the machine casing. The resilient support was afforded by a single vibration ring of relatively soft, resilient rubber or rubber-like material which absorbed the irregularities by enabling the sealing ring and the abutment ring to shift rapidly in unison, or without becoming separated in the presence of such operational irregularities. This expedient was quite satisfactory under some conditions but not under others. More particularly, the soft materials of which such vibration rings were formed were not adequately resistant to high temperatures commonly encountered in practice or to certain acids, gases and aromatic fluids and deteriorated very rapidly.

This situation seemed to indicate that all that should be done was to substitute in the vibration ring a material which was adequately resistant to such deleterious fluids; but no such adequately resistant materials are presently known which also possess the softness and resiliency necessary to support the abutment ring properly. One material, recently developed, which is adequately resistant to many and perhaps all such deleterious fluids, is polytetrafluoroethylene, commercially known as "Teflon." This substance, however, is relatively hard and non-resilient. It possesses some slight resiliency which is more evident in relatively thin sections of the material, but in the thickness and form in which vibration rings are usually made, "Teflon" is relatively hard and non-resilient. Therefore, if "Teflon" is merely substituted for soft, resilient, rubber-like material in a vibration ring, there is not adequate compensation or absorption of the mentioned shaft operational irregularities and the related sealing device fails of its sealing purpose.

Although the problem has been stated with reference to a mechanical seal which turns with a shaft and seals with an abutment ring carried in the machine casing, substantially the same problem exists where the mechanical seal is non-rotatively carried by a machine casing and the abutment ring turns with a related shaft.

Accordingly, an important object of this invention is the provision of means, highly resistant to such deleterious fluids, for vibrationally supporting an abutment ring for sealing coaction with a related, relatively rotatable sealing device.

Another important object is the provision of a vibration ring having the hardness and low resiliency of "Teflon" wherein the vibration ring is so formed as to have certain portions of such relative thinness and in such operational relation to other parts as to give the ring as a whole sufficient resiliency to permit a supported abutment ring to cooperate with a related sealing ring in such manner as to compensate for shaft operational irregularities without material leakage between the two latter rings.

These and other more or less obvious objects are accomplished, according to this invention, by forming the vibration ring of two distinct ring members of "Teflon" or somewhat similar material with adjacent radially extending annular surfaces almost, but not fully, complementally grooved and ridged annularly; the two ring members, thus, partially inter-nesting when the two said members are assembled coaxially, so that axially applied force, as would be derived from a coacting mechanical seal, causes one of the ring members, hereinafter referred to as a male ring member, to tend to nest more fully within the other, or female, ring member to flex inner and/or outer peripheral wall portions of the latter radially inwardly and/or outwardly for sealing purposes with adjacent cylindrical surfaces. An indirect effect of such radial flexing is to permit limited but adequate vibration of the two ring members relatively to each other in an axial direction and, also, to permit said two members to tilt slightly relatively to each other and thereby permit a related abutment ring to work in unison with a sealing ring of a coacting sealing device without causing material leakage between the two latter rings.

Although the principles of this invention may be utilized in ring structures of numerous shapes in cross-section, nevertheless, the invention is shown for illustrative purposes in the accompanyng drawing as exemplified in only two of such numerous embodiments without, however, limiting the invention to the particular illustrated structures.

In the drawing:

Figure 1 is an axial sectional view of a shaft, a bearing and seal for the shaft and a related composite vibration ring according to a preferred embodiment of this invention.

Figure 2 is an enlarged side view of the vibration ring shown in Figure 1, in its unstressed condition as before installation for use in a machine; the ring being in axial section in the upper half of this figure and in elevation in the lower half, and the figure further, fragmentarily, including certain related machine parts.

Figure 3 is a side view, similar in character to Figure 2, but illustrating a modified form of composite vibration ring.

In Figure 1 there are shown a shaft 12 on which is fixed a pump impeller 14, a bearing 16 by which the shaft and impeller are supported for rotation within a pump casing, of which a portion is shown at 18, and a mechanical seal 20 fluid-tightly fixed upon the shaft for rotation therewith in rotary sliding sealing association with an abutment ring 22 supported within the pump casing by a composite vibration ring 24 according to this invention.

The mechanical seal 20 may be of any suitable design, as the details of such a seal form no part of the present invention.

The illustrated seal comprises a mounting or adapter ring or sleeve 26 of "Teflon" or other suitable corrosion or acid resistant material, fluid-tightly encircling the shaft and backed up against rightward movement along the shaft by a split snap ring 28 seated within an annular groove 30 in the shaft. A generally cylindrical shell 32 with an inner flange 34, squeeze-fitted upon the sleeve 26, encloses a compression coil spring 36 which bears at its left or outer end against a washer 38, which, in turn, bears against an O ring 40 of "Teflon" or other suitable corrosion or acid resistant material. The O ring, thus, is fluid-tightly wedged between the shaft and an inner frusto-conical surface 42 of a rigid sealing ring 44. The force of the spring, communicated through the O ring, yieldably urges the sealing ring 44 leftwardly or outwardly into sliding, rotary sealing engagement with abutment ring 22.

The outer edge of the shell is flanged inwardly as at 46, and this flange extends into axial alignment with a shoulder 48 on the sealing ring 44 to retain the latter as well as the O ring 40, the washer 38 and the spring 36 within the shell as a unitary or package assembly. The shell, also, may be dimpled or pressed inwardly to form an internal lug 50 which extends slidably within an axially extending, external groove 52 in the sealing ring 44 to constrain the latter to rotate with the shaft. As the O ring 40, the adapter sleeve 26 and the vibration ring 24 are all of "Teflon" or other somewhat similar corrosion or acid resistant material and the other described parts are of suitable corrosion-resistant metal or compositions, the described sealing means as a whole is well suited for sealing purposes in the presence of corrosive acids or other deleterious fluids.

The composite vibration ring 24, as best seen in Figure 2, comprises a female ring 54 having a continuous, V-shaped annular groove 56 formed in a side face thereof and defined by angularly related, adjoining, annular walls 57, 57a. The groove 56 receives therewithin an adjacent, continuous, annular, side face wedging portion of a male ring 58. The rings 54 and 58, preferably, are of "Teflon" or more or less equivalent material.

The female ring 54 is approximately cylindrical in its unstressed form and (as exaggeratedly shown in Fig. 2) of a substantially uniform radial thickness preferably very slightly less than the radial dimension of the space provided for said female ring between an inner cylindrical surface 60 of the machine casing and an outwardly facing cylindrical surface 62 of an annular, external rabbet 64, formed in the outer end of the abutment ring 22.

As best seen in Figure 2, the male ring 58 has an annular side face wedging portion defined by angularly related, annular wedging surfaces 66, 66a interconnected by a flat end surface 68, the angle between the wedging surfaces 66, 66a, in the vibration ring's unstressed condition, being greater than the angle between the surfaces 57, 57a. When the two rings 54, 58 are assembled in place between cylindrical surfaces 60 and 62, a flat end surface 70 of the female ring backs against a flat, internal, abutment surface 72 of a cap 74 which is secured to machine-casing portion 18 by bolts 76, and the opposite flat end surface 78 of the male ring bears against a flat surface 80 of the abutment ring 22.

The axially applied force of the spring 36, communicated to the composite vibration ring through washer 38, O ring 40, rigid sealing ring 44 and abutment ring 22, places the composite vibration ring under axial compression; causing the male ring 58 to seat tightly within the groove 56 of the female ring to wedge and expand the latter radially inwardly and/or outwardly in the vicinity of its grooved end, as indicated in broken lines in Figure 2, to an extent sufficient to cause the female ring 54 to fluid-tightly engage the cylindrical surfaces 60 and 62. It is known to those familiar with this art that the dimensions of the various parts may, alternatively, be such that pressure of the sealed fluid or of sealing fluid which sometimes is used, may augment or otherwise modify the action of the spring in maintaining the vibration ring under axial compression, but for present purposes it should suffice to remember that, in use, the vibration ring is maintained under axial compression, in sealing association with the cylindrical surfaces 60 and 62 as well as with flat surfaces 72 and 80.

Experience shows that a two-piece or composite vibration ring of "Teflon" or equivalent material, as illustrated and described, serves satisfactorily as a cushion support for the abutment ring 22 to enable the latter to maintain an adequate sealing effect with related mechanical seal 20 despite vibrations arising from irregular shaft operation. On the other hand, a one-piece ring, if of "Teflon" or equivalent material and of a sectional shape or shapes according to prior vibration rings, does not function satisfactorily as a vibration ring to seal with respect to a mechanical seal.

The reason for such satisfactory service of a composite vibration ring according to this invention appears to reside in a slight, vibratory, wedging, axial and/or tilting, relative shifting between the two rings 54 and 58. With reference to such axial relative shifting, it appears that slight end play of the shaft in its bearings would cause the compressive forces, applied axially to the vibration ring, to fluctuate rhythmically or with great rapidity, so that the male ring 58 rapidly moves inwardly and outwardly, slightly, relatively to the groove 56 in the female ring and thereby radially vibrates the tapered annular portions of the latter ring which define said groove. This vibration of said tapered portions is possible because of the fact that the female ring 54 in its unstressed condition is not a tight fit between the cylindrical surfaces 60 and 62. Although it might appear that such vibration of the tapered portions of the female ring would cause fluid leakage axially of the vibration ring, such leakage does not occur, possibly because, despite the relatively low deformability of the "Teflon," it may deform sufficiently to cause the solid back end of the female ring or the thicker parts of the tapered portions of said ring to expand radially under the compressive axial force applied thereto to effect a seal with surfaces 60 and 62, while the thinner, free edge, marginal parts of said tapered portions flex rapidly to afford the desired cushioning effect.

With reference to tilting relative shifting of the rings 54 and 58, "Teflon" has a very low co-efficient of friction which, apparently, permits one circumferential portion of the ring 58 to freely slide more deeply than an opposite circumferential portion into the groove of the ring 58; and such tilting can occur very rapidly or vibrationally, also because of the mentioned friction characteristic of "Teflon."

The embodiment illustrated in Figure 3 differs from that of Figure 2, chiefly in having wedging parts of different shapes than those shown in the latter figure. In the embodiment of Figure 3, a female ring 86 and a male ring 88, both of "Teflon" or more or less equivalent material, have cooperating wedging parts derived from forming the ring 88 of circular shape in cross-section and from forming an annular groove 90 of semi-circular shape in cross-section in the adjacent end face of the ring 86; the arrangement being such that the sectional diameter of the ring 88 is somewhat greater than the width of the opening of the groove 90. Under this arrangement, the ring 88, under axial compression of the composite ring, partially wedges itself into the groove 90, as indicated by broken lines, with the result that the female ring 86 is expanded radially, as also indicated in broken lines, the effect of such wedging and expansion being substantially the same as with the described first embodiment.

In both illustrated embodiments, the outer edges of the outer and inner peripheries of the female ring may be beveled or chamfered as shown at 92, 94 and the outer edges of the outer and inner peripheries of the male ring 58 of the first embodiment may similarly be beveled as at 96, 98; these bevels serving to assure uniform contact of the end and peripheral surfaces of the composite vibration ring with the several mentioned flat and cylindrical surfaces of the machine casing and the abutment ring.

It has been hereinbefore indicated that the radial thickness of the female ring, in its unstressed condition, should be slightly less than the radial dimension of the space between cylindrical surfaces 60 and 62 of the machine casing and the abutment ring. This differential, preferably, is provided by forming the female ring of an inside diameter which is slightly greater than the diameter of the abutment ring at its cylindrical surface 62 and of an outside diameter which is slightly less than the diameter of the machine casing at its cylindrical surface 60. Under this arrangement, both the inner and outer tapered portions of the female ring may flex slightly in the manner hereinbefore described. In some circumstances, however, which may frequently occur in practice, the female ring, in its unflexed condition, may be of about the same inside diameter as the diameter of the abutment ring at surface 62 or may be of about the same outside diameter as the diameter of the machine casing at surface 60, so that one or the other, but not both, of the tapered portions of the female ring will flex in operation. Under either of the latter conditions, the device is adequate for its stated purposes.

It should be understood that the two embodiments described herein are only exemplary of various ways in which the present inventive concept may be advantageously employed and, therefore, this invention should be considered as of a scope which includes all such variations as are not clearly excluded by the following claims.

I claim:

1. A vibratory packing ring assembly for effecting a seal between two relatively rotatable, intertelescoping machine elements, said assembly comprising a portion of a first of said elements having a cylindrical surface and an adjoining flat surface, an abutment ring, non-rotatable relatively to said first machine element and having adjoining cylindrical and flat surfaces disposed in opposition to said surfaces respectively of said first machine element and forming therewith an intervening annular space of rectangular shape in cross section, said abutment ring having an outer, radial surface adapted for sliding sealing engagement with a radial surface non-rotatably associated with the second of said elements, and a two-piece vibration ring in said annular space; said vibration ring comprising a male ring member which is substantially non-deformable cross-sectionally, and a female ring member of relatively hard, flexible, plastic material having a low coefficient of friction; said female ring member having a substantially flat surface at one side thereof in sealing engagement with one of the flat surfaces forming said space, and flexible, inner and outer peripheral sealing lips defining an axially facing annular groove therebetween at the other side of the female ring member, and said male ring member having, at one side thereof, an annular portion slidable axially in said groove to expand said lips into sealing engagement with said opposed cylindrical surfaces and having its other side in sealing engagement with the other of the flat surfaces forming said space.

2. An assembly according to claim 1, said male ring member being of polytetrafluoroethylene.

3. An assembly according to claim 1, said groove and said annular portion of the male ring member having V-shaped surfaces which are partially complemental as viewed in radial-axial section and the inside angle between said V-shaped surfaces of said annular portion of the male ring member being greater than the inside angle between said V-shaped surfaces of said groove.

4. An assembly according to claim 1, said groove being arcuate as viewed in radial-axial section and said male ring member being round in cross section and adapted to coact with opposite outer marginal wall portions of the groove to expand the female member radially.

5. An assembly according to claim 1, said groove and said annular portion of the male ring member being arcuate and partially complemental as viewed in radial-axial section and the radius of such arcuate curvature of said annular portion of the male ring member being greater than the radius of such arcuate curvature of the groove.

References Cited in the file of this patent

UNITED STATES PATENTS

| | | |
|---|---|---|
| 1,949,610 | Marsh | Mar. 6, 1934 |
| 2,075,947 | Kennedy | Apr. 6, 1937 |
| 2,467,312 | Jack | Apr. 12, 1949 |
| 2,494,598 | Waring | Jan. 17, 1950 |
| 2,550,667 | Blom | May 1, 1951 |
| 2,561,132 | Payne | July 17, 1951 |
| 2,670,973 | Ginther et al. | Mar. 2, 1954 |
| 2,705,177 | Waring | Mar. 29, 1955 |

FOREIGN PATENTS

| | | |
|---|---|---|
| 486,716 | Great Britain | June 9, 1938 |